(12) United States Patent
Miyamoto

(10) Patent No.: US 11,955,714 B2
(45) Date of Patent: Apr. 9, 2024

(54) ANTENNA APPARATUS, RADIO TRANSMITTER, AND ANTENNA DIAMETER ADJUSTMENT METHOD

(71) Applicant: NEC Corporation, Tokyo (JP)

(72) Inventor: Hiroaki Miyamoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 62 days.

(21) Appl. No.: 17/617,643

(22) PCT Filed: May 14, 2020

(86) PCT No.: PCT/JP2020/019213
§ 371 (c)(1),
(2) Date: Dec. 9, 2021

(87) PCT Pub. No.: WO2020/255594
PCT Pub. Date: Dec. 24, 2020

(65) Prior Publication Data
US 2022/0247086 A1 Aug. 4, 2022

(30) Foreign Application Priority Data

Jun. 17, 2019 (JP) .................. 2019-112170

(51) Int. Cl.
*H01Q 19/17* (2006.01)
*H01Q 1/24* (2006.01)
(Continued)

(52) U.S. Cl.
CPC ............. *H01Q 19/17* (2013.01); *H01Q 1/247* (2013.01); *H01Q 1/28* (2013.01); *H01Q 3/01* (2013.01); *H01Q 15/18* (2013.01)

(58) Field of Classification Search
CPC .......... H01Q 19/17; H01Q 1/247; H01Q 1/28; H01Q 3/01; H01Q 15/18; H01Q 19/104; H01Q 19/106
See application file for complete search history.

(56) References Cited

U.S. PATENT DOCUMENTS 3,618,111 A * 11/1971 Vaughan ............. H01Q 15/161
343/915
3,631,505 A * 12/1971 Carman ............. H01Q 15/161
343/915
(Continued)

FOREIGN PATENT DOCUMENTS

CN 209016260 U * 6/2019
JP 2016-513432 A 5/2016
(Continued)

OTHER PUBLICATIONS

JP Office Action for JP Application No. 2021-527460, dated Oct. 18, 2022 with English Translation.
(Continued)

*Primary Examiner* — Graham P Smith
*Assistant Examiner* — Jordan E. DeWitt

(57) ABSTRACT

An antenna diameter adjustment method for adjusting an antenna diameter by changing a distance between a part of each of a plurality of reflectors at which the radio signal is reflected, the plurality of reflectors each being configured to reflect radio signals emitted from a plurality of radiators from a center of a circle along a radial direction thereof and to radiate the radio signal toward an opposite antenna apparatus, and the center of the circle along the radial direction of the circle.

9 Claims, 12 Drawing Sheets

(51) Int. Cl.
    *H01Q 1/28* (2006.01)
    *H01Q 3/01* (2006.01)
    *H01Q 15/18* (2006.01)

(56) References Cited

U.S. PATENT DOCUMENTS

| | | | | |
|---|---|---|---|---|
| 5,162,811 A | * | 11/1992 | Lammers | H01Q 15/20 |
| | | | | 343/915 |
| 5,283,591 A | * | 2/1994 | Delmas | H01Q 19/065 |
| | | | | 343/757 |
| 5,479,176 A | * | 12/1995 | Zavrel, Jr. | H01Q 3/242 |
| | | | | 342/374 |
| 5,969,689 A | * | 10/1999 | Martek | H01Q 1/42 |
| | | | | 343/758 |
| 6,140,978 A | * | 10/2000 | Patenaude | H01Q 5/30 |
| | | | | 343/756 |
| 6,340,956 B1 | * | 1/2002 | Bowen | H01Q 15/161 |
| | | | | 343/915 |
| 6,720,936 B1 | * | 4/2004 | Koolish | H01Q 3/01 |
| | | | | 343/909 |
| 9,859,620 B1 | * | 1/2018 | Gauba | H01Q 21/205 |
| 9,991,607 B1 | * | 6/2018 | West | H01Q 13/0275 |
| 10,276,933 B1 | * | 4/2019 | Chukka | H01Q 3/06 |
| 11,177,990 B1 | * | 11/2021 | Gil | H01Q 21/20 |
| 2004/0027304 A1 | * | 2/2004 | Chiang | H01Q 3/446 |
| | | | | 343/810 |
| 2004/0196813 A1 | * | 10/2004 | Ofek | H04B 7/0491 |
| | | | | 370/278 |
| 2004/0246191 A1 | * | 12/2004 | Melconian | H01Q 19/12 |
| | | | | 343/779 |
| 2005/0068251 A1 | * | 3/2005 | Ebling | H01Q 3/247 |
| | | | | 343/911 L |
| 2011/0187627 A1 | * | 8/2011 | Palmer | H01Q 15/161 |
| | | | | 343/915 |
| 2011/0274146 A1 | * | 11/2011 | Huang | H01Q 1/38 |
| | | | | 343/837 |
| 2015/0372398 A1 | * | 12/2015 | Dudorov | H01Q 19/17 |
| | | | | 342/368 |
| 2016/0064815 A1 | | 3/2016 | Moon et al. | |
| 2016/0285170 A1 | * | 9/2016 | Hsu | H01Q 19/17 |
| 2016/0315392 A1 | * | 10/2016 | Tanabe | H01Q 3/20 |
| 2018/0287263 A1 | | 10/2018 | Hirabe | |
| 2019/0348755 A1 | * | 11/2019 | Berioli | H01Q 3/06 |
| 2019/0348759 A1 | * | 11/2019 | Walker | H01Q 3/01 |
| 2019/0379120 A1 | * | 12/2019 | Manasson | H01Q 21/245 |
| 2021/0028560 A1 | * | 1/2021 | Zenkyu | H04B 1/02 |
| 2021/0211168 A1 | * | 7/2021 | Sasaki | H04B 10/112 |
| 2022/0166124 A1 | * | 5/2022 | Ayotte | H01Q 19/193 |
| 2022/0200145 A1 | * | 6/2022 | Boutayeb | H01Q 3/22 |
| 2022/0216618 A1 | * | 7/2022 | Nakajima | H01Q 19/19 |
| 2022/0328977 A1 | * | 10/2022 | Hikido | H01Q 3/20 |
| 2022/0399918 A1 | * | 12/2022 | Olesen | H04B 7/088 |

FOREIGN PATENT DOCUMENTS

| | | | | |
|---|---|---|---|---|
| JP | 2017-224988 A | | 12/2017 | |
| JP | 2018-033108 A | | 3/2018 | |
| WO | 2016/104863 A1 | | 6/2016 | |
| WO | WO-2016104863 A1 | * | 6/2016 | H01Q 15/16 |
| WO | 2017/056136 A1 | | 4/2017 | |
| WO | 2019/059409 A1 | | 3/2019 | |
| WO | WO-2019235933 A1 | * | 12/2019 | G01S 13/89 |
| WO | WO-2020255594 A1 | * | 12/2020 | H01Q 1/247 |

OTHER PUBLICATIONS

International Search Report for PCT Application No. PCT/JP2020/019213, dated Jul. 21, 2020.

Lee, Doohwan et al., "An Experimental Demonstration of 28 GHz Band Wireless OAM-MIMO (Orbital Angular Momentum Multi-input and Multi-output) Multiplexing", 2018 IEEE 87th Vehicular Technology Conference, Jul. 26, 2018, pp. 1-5.

* cited by examiner

ANTENNA APPARATUS, RADIO TRANSMITTER, AND ANTENNA DIAMETER ADJUSTMENT METHOD

This application is a National Stage Entry of PCT/JP2020/019213 filed on May 14, 2020, which claims priority from Japanese Patent Application 2019-112170 filed on Jun. 17, 2019, the contents of all of which are incorporated herein by reference, in their entirety.

TECHNICAL FIELD

The present disclosure relates to an antenna apparatus, a radio transmitter, a radio receiver, a radio communication system, and an antenna diameter adjustment method.

BACKGROUND ART

In a radio communication system, a technique for multiplexing electromagnetic waves using Orbital Angular Momentum (OAM) of the electromagnetic waves and increasing the transmission capacity has been proposed. Electromagnetic waves having the OAM can be generated using a Uniform Circular Array (UCA) antenna. In electromagnetic waves having the OAM, the trajectories of electromagnetic waves of the same phase becomes spiral with respect to the traveling direction. The number of rotations of the spiral while an electromagnetic wave travels by one wavelength is referred to as an OAM mode. The OAM modes do not interfere with each other. Therefore, each OAM mode can be transmitted being superimposed with one another in the same frequency and time and can be separated from each other. An OAM mode multiplex transmission technique is a technique for performing spatial multiplexing of electromagnetic waves on one pathway using this property.

As the related art, Patent Literature 1 discloses a radio antenna used for OAM mode multiplex transmission. The radio antenna disclosed in Patent Literature 1 includes a primary radiator and a parabolic mirror part. The primary radiator forms a helical beam (a first helical beam) for forming an electromagnetic wave having OAM and outputs the first helical beam. The first helical beam output from the primary radiator is reflected by the parabolic mirror part and transmitted in a constant direction as a second helical beam. The parabolic mirror part expands a first electromagnetic field distribution which the first helical beam has, forms a second helical beam having a second electromagnetic field distribution larger than the first electromagnetic field distribution, and outputs the second helical beam.

CITATION LIST

Patent Literature

Patent Literature 1: International Patent Publication No. WO2017/056136

SUMMARY OF INVENTION

Technical Problem

Note that an antenna used for OAM mode multiplex transmission has an optimum antenna array diameter that changes in accordance with a transmission distance of a radio signal. In Patent Literature 1, the antenna diameter is determined by the diameter of the parabolic mirror part. Therefore, by replacing the parabolic mirror part used in combination with the primary radiator, it is possible to achieve a desired antenna diameter using the same primary radiator. However, in Patent Literature 1, the antenna diameter cannot be adjusted as desired without replacing the parabolic mirror part.

In view of the above-described circumstances, an object of the present disclosure is to provide an antenna apparatus, an antenna diameter adjustment method, a radio transmitter, a radio receiver, and a radio communication system that are capable of adjusting an antenna diameter without replacing components.

Solution to Problem

In order to achieve the aforementioned object, the present disclosure provides, as a first example aspect, an antenna apparatus including a plurality of antenna elements each configured to emit a radio signal transmitted to an opposite antenna apparatus, in which each of the plurality of antenna elements includes a radiator configured to output the radio signal from a center of a circle along a radial direction thereof, and a reflector configured to reflect the radio signal output from the radiator toward the opposite antenna apparatus, and a distance between the center of the circle and a part of the reflector at which the radio signal is reflected is adjustable along the radial direction of the circle.

The present disclosure provides, as a second example aspect, an antenna apparatus including a plurality of antenna elements each configured to receive a radio signal transmitted from an opposite antenna apparatus, in which each of the plurality of antenna elements includes a reflector configured to reflect the radio signal toward a center of a circle along a radial direction thereof, and a radiator to which the radio signal is input via the reflector, and a distance between the center of the circle and a part of the reflector at which the radio signal is reflected is adjustable along the radial direction of the circle.

The present disclosure provides, as a third example aspect, a radio transmitter comprising: a radio signal generation unit configured to generate a radio signal transmitted toward an opposite radio receiver; and an antenna unit configured to transmit the radio signal, in which the antenna unit comprises a plurality of antenna elements each configured to emit the radio signal, each of the plurality of antenna elements comprises a radiator configured to output the radio signal from a center of a circle along a radial direction thereof, and a reflector configured to reflect the radio signal output from the radiator toward the opposite radio receiver, and a distance between the center of the circle and a part of the reflector at which the radio signal is reflected is adjustable along the radial direction of the circle.

The present disclosure provides, as a fourth example aspect, a radio receiver including: an antenna unit configured to receive a radio signal from an opposite radio transmitter; and a radio signal processing unit configured to demodulate a transmission signal from the radio signal, in which the antenna unit comprises a plurality of antenna elements each configured to receive the radio signal, each of the plurality of antenna elements includes a reflector configured to reflect the radio signal toward a center of a circle along a radial direction thereof, and a radiator to which the radio signal is input via the reflector, and a distance between the center of the circle and a part of the reflector at which the radio signal is reflected is adjustable along the radial direction of the circle.

The present disclosure provides, as a fifth example aspect, a radio communication system including: a radio transmitter including a radio signal generation unit configured to generate a radio signal, and a transmission antenna unit configured to transmit the radio signal; and a radio receiver including a reception antenna unit configured to receive a radio signal transmitted from the transmission antenna unit, and a radio signal processing unit configured to demodulate the radio signal, in which the transmission antenna unit includes a plurality of transmission antenna elements each configured to emit the radio signal, each of the plurality of transmission antenna elements includes a radiator configured to output the radio signal from a center of a circle along a radial direction thereof and a reflector configured to reflect the radio signal output from the radiator toward the reception antenna unit, and a distance between the center of the circle and a part of the reflector at which the radio signal is reflected is adjustable along the radial direction of the circle, and the reception antenna unit includes a plurality of reception antenna elements each configured to receive a radio signal, each of the plurality of reception antenna elements includes a reflector configured to reflect the radio signal toward a center of a circle along a radial direction thereof and a radiator to which the radio signal is input via the reflector, and a distance between the center of the circle and a part of the reflector at which the radio signal is reflected is adjustable along the radial direction of the circle.

The present disclosure provides, as a sixth example aspect, an antenna diameter adjustment method for adjusting an antenna diameter by reflecting radio signals emitted from a plurality of radiators from a center of a circle along a radial direction thereof, and changing a distance between a part of each of a plurality of reflectors at which the radio signal is reflected and the center of the circle along the radial direction of the circle, the plurality of reflectors each being configured to radiate the radio signal toward an opposite antenna apparatus.

Advantageous Effects of Invention

The antenna apparatus, the antenna diameter adjustment method, the radio transmitter, the radio receiver, and the radio communication system according to the present disclosure can adjust an antenna diameter without replacing components.

DESCRIPTION OF EMBODIMENTS

Figure 1:
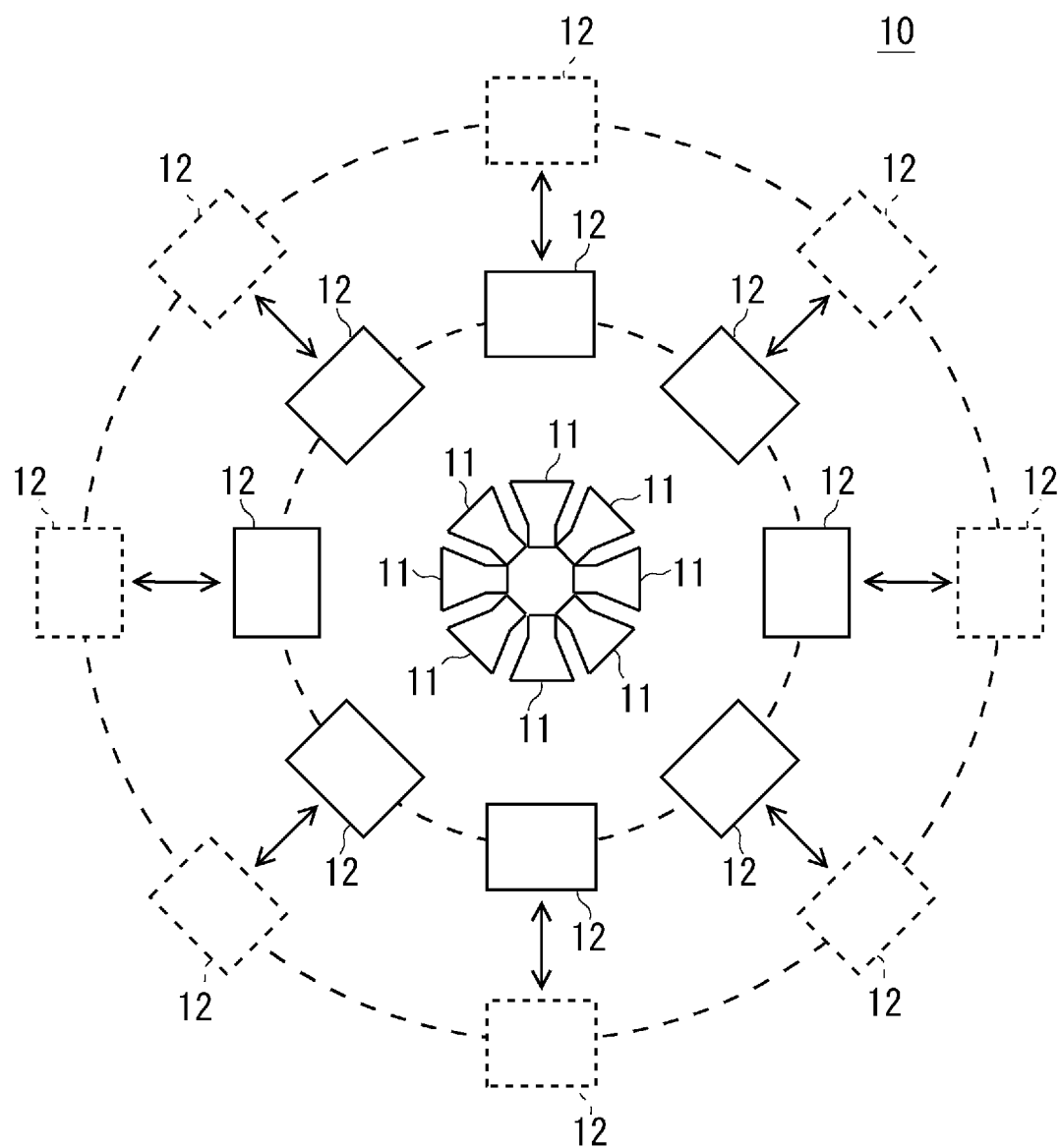
FIG. 1 is a block diagram showing a schematic configuration of an antenna apparatus according to the present disclosure.

Prior to describing example embodiments according to the present disclosure, an overview of the example embodiments will be given. FIG. 1 shows a schematic configuration of an antenna apparatus according to the present disclosure. An antenna apparatus 10 has a plurality of radiators 11 and a plurality of reflectors 12. Each radiator 11 and each reflector 12 constitute an antenna element. In other words, the antenna apparatus 10 includes a plurality of antenna elements. The antenna apparatus 10 emits a radio signal toward an opposite antenna apparatus on the reception side. Alternatively, the antenna apparatus 10 receives a radio signal from an opposite antenna apparatus on the transmission side. The antenna apparatus 10 may perform both transmission and reception of radio signals.

Figure 2:
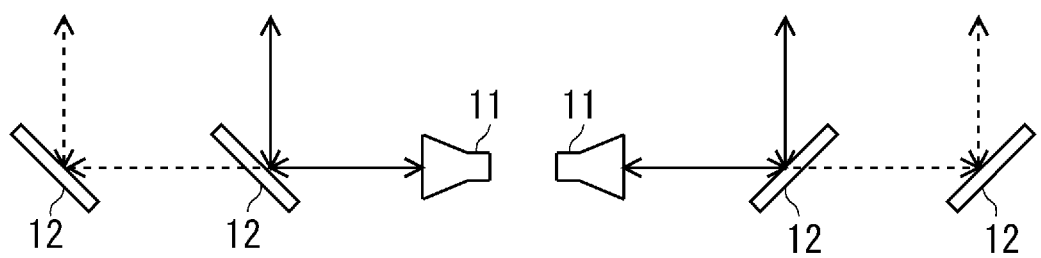
FIG. 2 is a side view of a part of the antenna apparatus when viewed in a direction parallel to a circular plane.

FIG. 2 is a side view of a part of the antenna apparatus when viewed in a direction parallel to a circular plane. The radiator 11 is disposed near the center of a circle. In the transmission, each radiator 11 outputs a radio signal from the center of the circle along a radial direction thereof toward the reflector 12. The reflector 12 reflects a radio signal output from the radiator 11 toward the opposite antenna apparatus. In the reception, the reflector 12 reflects a radio signal transmitted from the opposite antenna apparatus to the radiator 11 along a radial direction of the circle toward the center thereof. Each radiator 11 receives a radio signal via the reflector 12.

The antenna apparatus 10 is configured so that a distance between the center of the circle and a part of the reflector 12 at which a radio signal is reflected is adjustable along the radial direction of the circle. In the configuration shown in FIGS. 1 and 2, the antenna apparatus 10 is configured so that the position of the reflector 12 is adjustable along the radial direction of the circle. An antenna diameter of the antenna apparatus 10 can be adjusted by changing the position of the reflector 12 and changing the distance between the radiator 11 and the reflector 12.

In this example embodiment, in the antenna apparatus 10, the distance between the center of the circle and a part of the reflector 12 at which a radio signal is reflected is adjustable. In the configuration shown in FIG. 1, the antenna diameter can be freely adjusted within an adjustable range by adjusting the position of the reflector 12. Therefore, in the present disclosure, the antenna diameter can be adjusted without replacing components.

Figure 3:
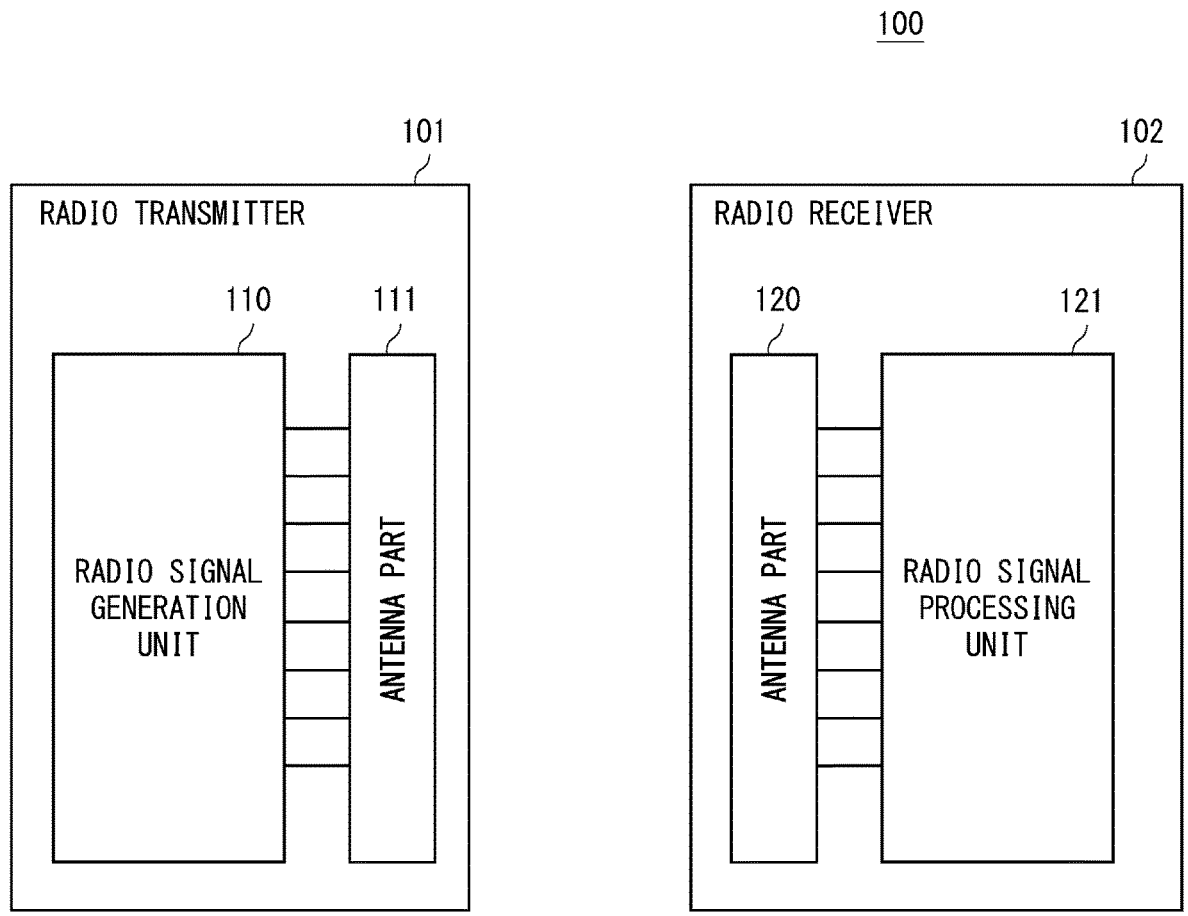
FIG. 3 is a block diagram showing a radio communication system according to a first example embodiment of the present disclosure.

The example embodiments will be described hereinafter with reference to the drawings. FIG. 3 shows a radio communication system according to a first example embodiment of the present disclosure. A radio communication system 100 includes a radio transmitter 101 and a radio receiver 102. The radio communication system 100 may be used, for example, for radio communication in a mobile backhaul line.

The radio transmitter 101 includes a radio signal generation unit 110 and an antenna part 111. The radio signal generation unit (radio signal generation means) 110 generates a radio signal to be transmitted to the opposite radio receiver 102. The antenna part (antenna unit) 111 transmits a radio signal. The radio receiver 102 includes an antenna part 120 and a radio signal processing unit 121. The antenna part 120 receives a radio signal from the opposite radio transmitter 101. The radio signal processing unit (radio signal processing means) 121 demodulates a transmission signal from the radio signal.

Figure 4:
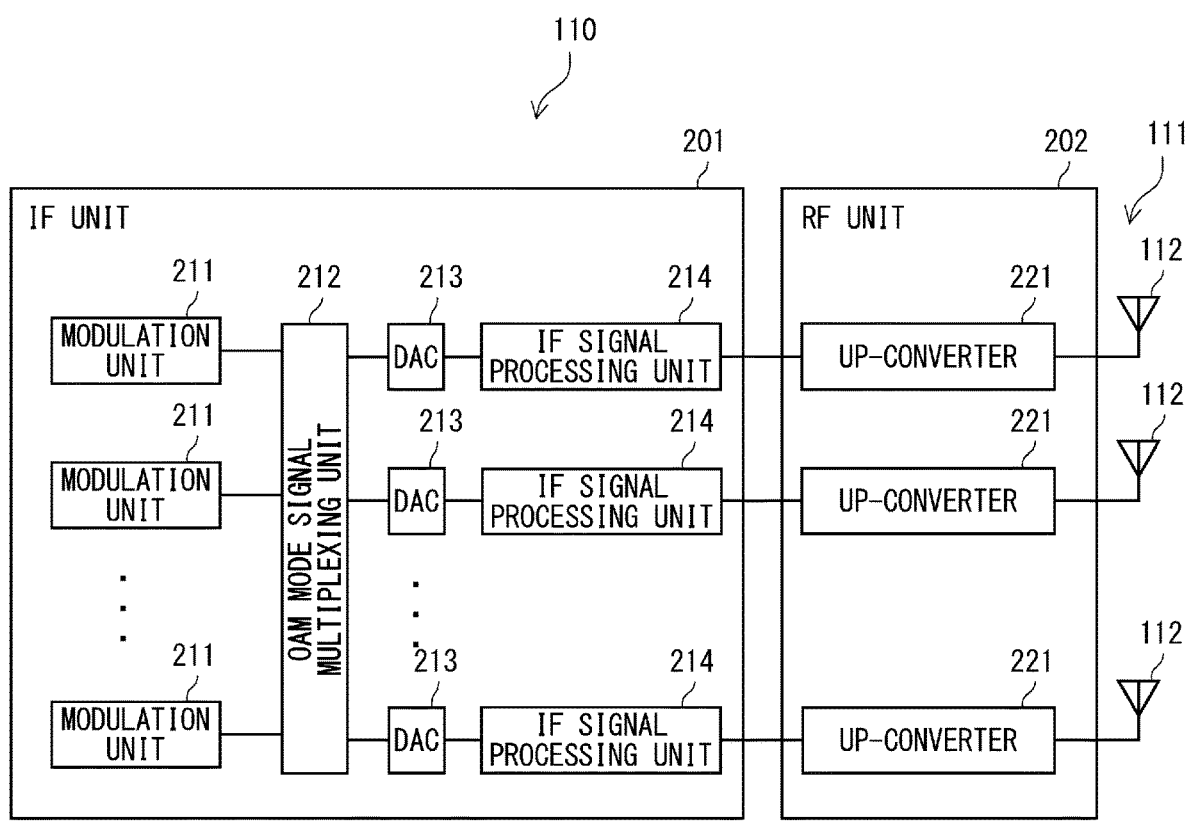
FIG. 4 is a block diagram showing a detailed configuration example of a radio transmitter.

FIG. 4 shows a detailed configuration example of the radio transmitter 101. The radio signal generation unit 110 includes an Intermediate Frequency (IF) unit 201 and a Radio Frequency (RF) unit 202. The IF unit 201 includes a plurality of modulation units 211, an OAM mode signal multiplexing unit 212, a plurality of Digital to Analog Converters (DACs) 213, and a plurality of IF signal processing units 214. The RF unit 202 includes a plurality of up-converters 221.

The antenna part 111 includes a plurality of antenna elements (transmission antenna elements) 112. The IF unit 201 includes the DACs 213 and the IF signal processing units 214 corresponding to the respective antenna elements 112. Further, the RF unit 202 includes the up-converters 221 corresponding to the respective antenna elements 112.

In the IF unit 201, each modulation unit 211 modulates a transmission signal in accordance with a predetermined modulation system and generates a modulation signal (a baseband signal). The OAM mode signal multiplexing unit (OAM mode signal multiplexing means) 212 multiplexes a plurality of modulation signals to a plurality of OAM modes. The OAM mode signal multiplexing unit 212 outputs an OAM mode signal transmitted from each antenna element 112. The modulation unit 211 and the OAM mode signal multiplexing unit 212 are configured as, for example, digital signal processing units.

Each DAC 213 converts an OAM mode signal from a digital signal to an analog signal. Each IF signal processing unit 214 converts an OAM mode signal into an IF signal. Each IF signal processing unit 214 may include an amplifier, a filter, and the like, and may perform amplification of an IF signal, filtering of the IF signal, and the like. Each IF signal processing unit 214 outputs an IF signal to the RF unit 202, for example, through a cable connecting the IF unit 201 to the RF unit 202.

In the RF unit 202, each up-converter 221 converts an IF signal into an RF signal (a radio signal). Each up-converter 221 converts an IF signal into, for example, a radio signal of a millimeter wave band. Each up-converter 221 and each antenna element 112 are connected to each other using, for example, a waveguide. Each up-converter 221 outputs the converted radio signal to each antenna element 112. Each antenna element 112 transmits a radio signal (an OAM mode radio signal). Note that the generation of the OAM mode signals and the transmission thereof are known to the public and the detailed descriptions thereof will be omitted.

Figure 5:
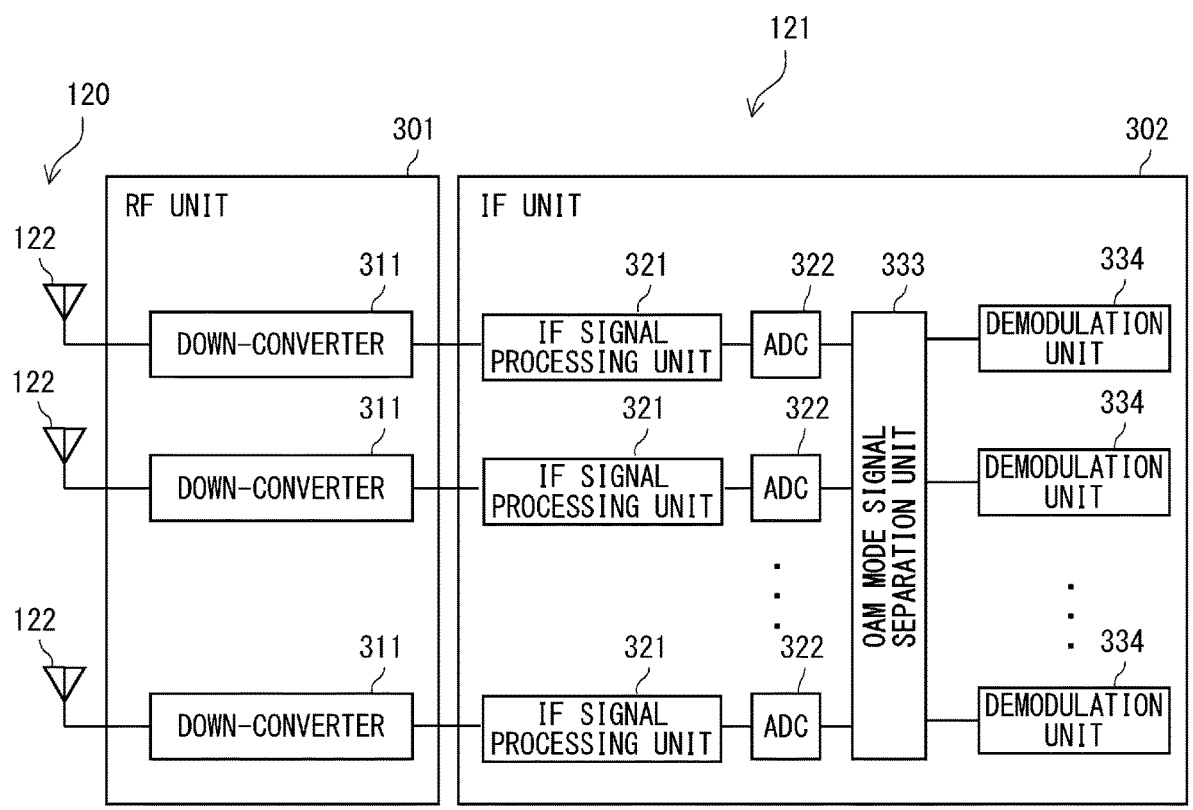
FIG. 5 is a block diagram showing a detailed configuration example of a radio receiver.

FIG. 5 shows a detailed configuration example of the radio receiver 102. The radio signal processing unit 121 includes an RF unit 301 and an IF unit 302. The RF unit 301 includes a plurality of down-converters 311. The IF unit 302 includes a plurality of IF signal processing units 321, a plurality of Analog to Digital Converters (ADCs) 322, an OAM mode signal separation unit 333, and a plurality of demodulation units 334.

The antenna part 120 includes a plurality of antenna elements (reception antenna elements) 122. The RF unit 301 includes the down-converters 311 corresponding to the respective antenna elements 122. Each antenna element 122 receives a radio signal (an OAM mode radio signal) transmitted from the antenna element 112 (see FIG. 4) of the opposite radio transmitter 101. Each antenna element 122 and each down-converter 311 are connected to each other using, for example, a waveguide. Each down-converter 311 down-converts a radio signal received by the antenna element 122 into an IF signal. Each down-converter 311 outputs an IF signal to the IF unit 302, for example, through a cable connecting the RF unit 301 to the IF unit 302.

The IF unit 302 includes the IF signal processing units 321 and the ADCs 322 corresponding to the respective antenna elements 122. Each IF signal processing unit 321 converts an IF signal into a baseband signal. Each IF signal processing unit 321 may include an amplifier, a filter, and the like, and may perform amplification of an IF signal, filtering of an IF signal, and the like. The ADC 322 converts an analog baseband signal into a digital signal. The OAM mode signal separation unit (OAM mode signal separation means) 333 separates a plurality of signals that have been multiplexed to a plurality of OAM modes. Each demodulation unit 334 demodulates the separated signal and restores a signal modulated on the transmission side. Note that the reception of the OAM mode signal and the separation thereof are known to the public and the detailed descriptions thereof will be omitted.

Note that the radio transmitter 101 may not only transmit a radio signal but also receive a radio signal. Further, the radio receiver 102 may not only receive a radio signal but also transmit a radio signal. In this case, the radio transmitter 101 may include the radio signal processing unit 121 in addition to the radio signal generation unit 110. Further, the radio receiver 102 may include the radio signal generation unit 110 in addition to the radio signal processing unit 121. When the radio transmitter 101 and the radio receiver 102 transmit and receive radio signals, the antenna parts 111 and 120 may be used for both the transmission and the reception of the radio signals.

Figure 6:
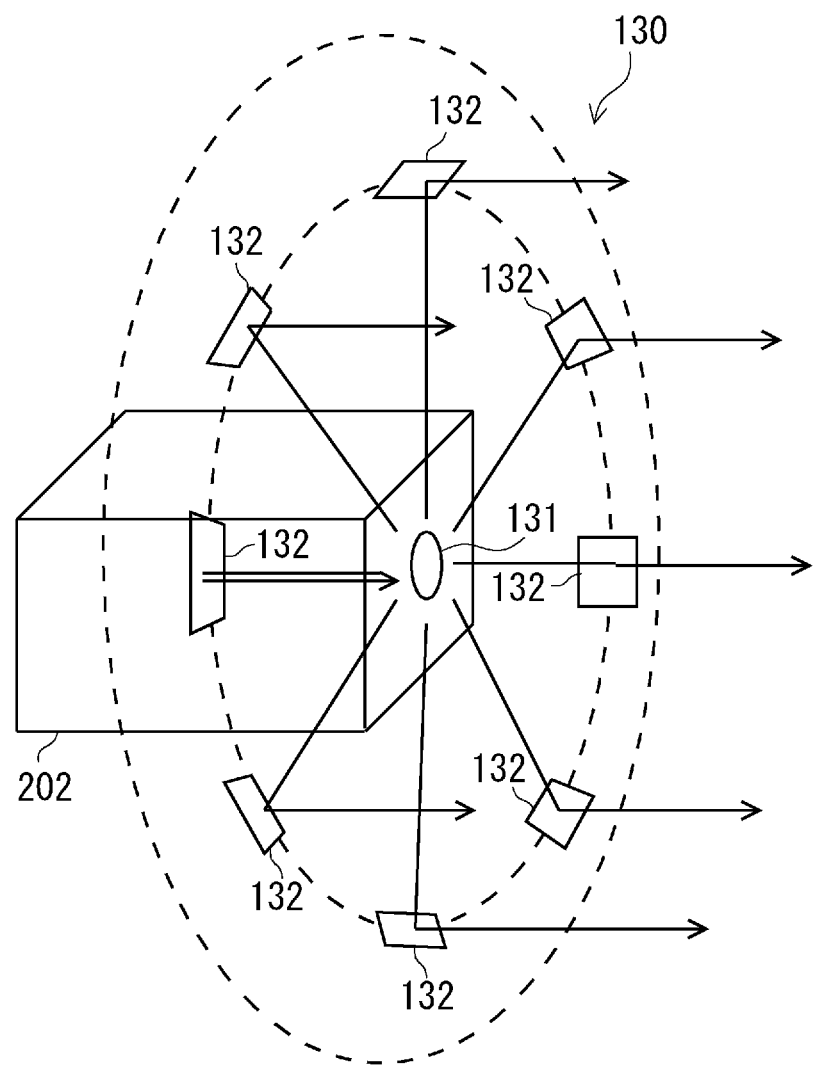
FIG. 6 is a perspective view showing the antenna apparatus.
Figure 7:
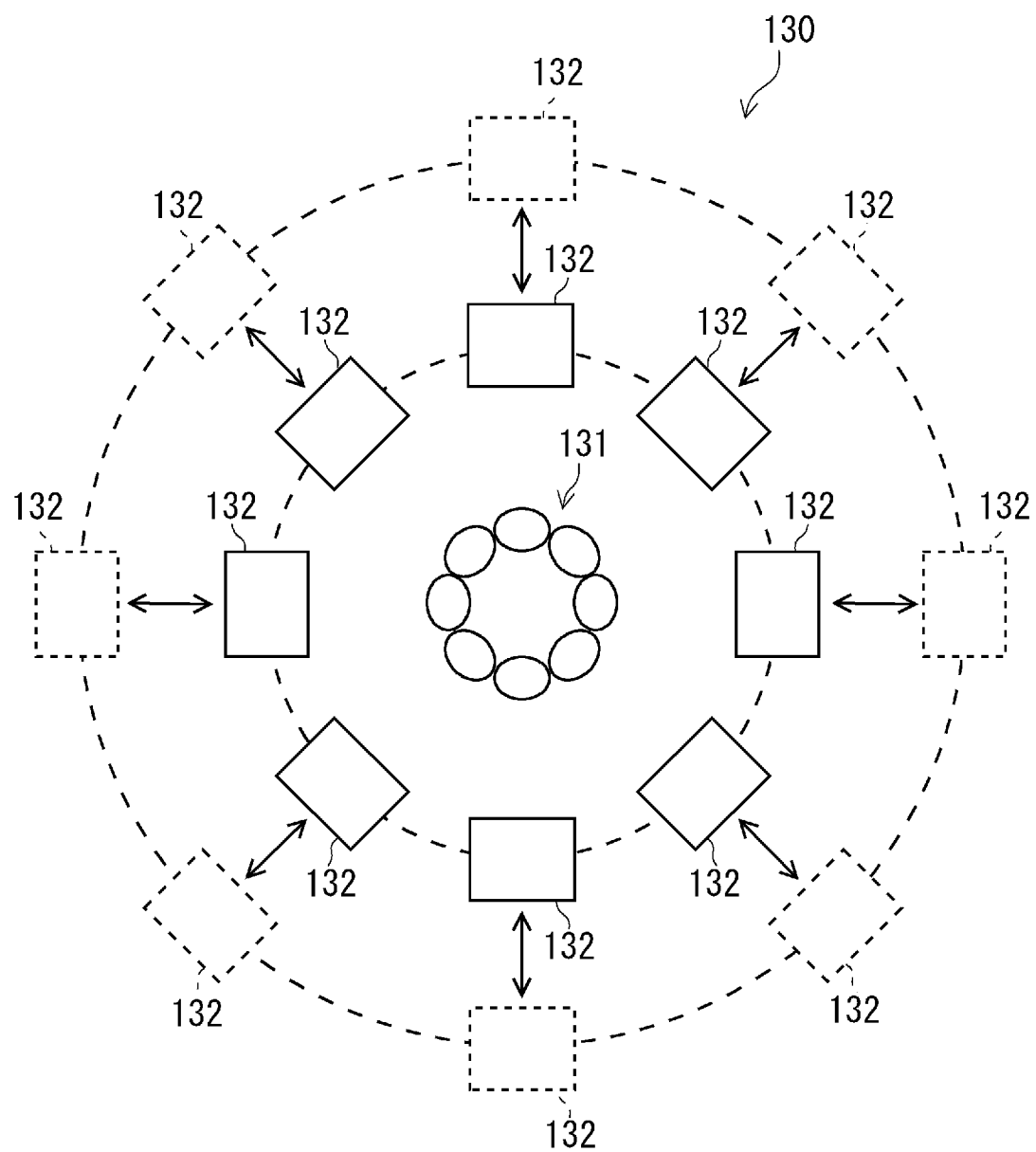
FIG. 7 is a front view of the antenna apparatus when viewed from the front.
Figure 8:
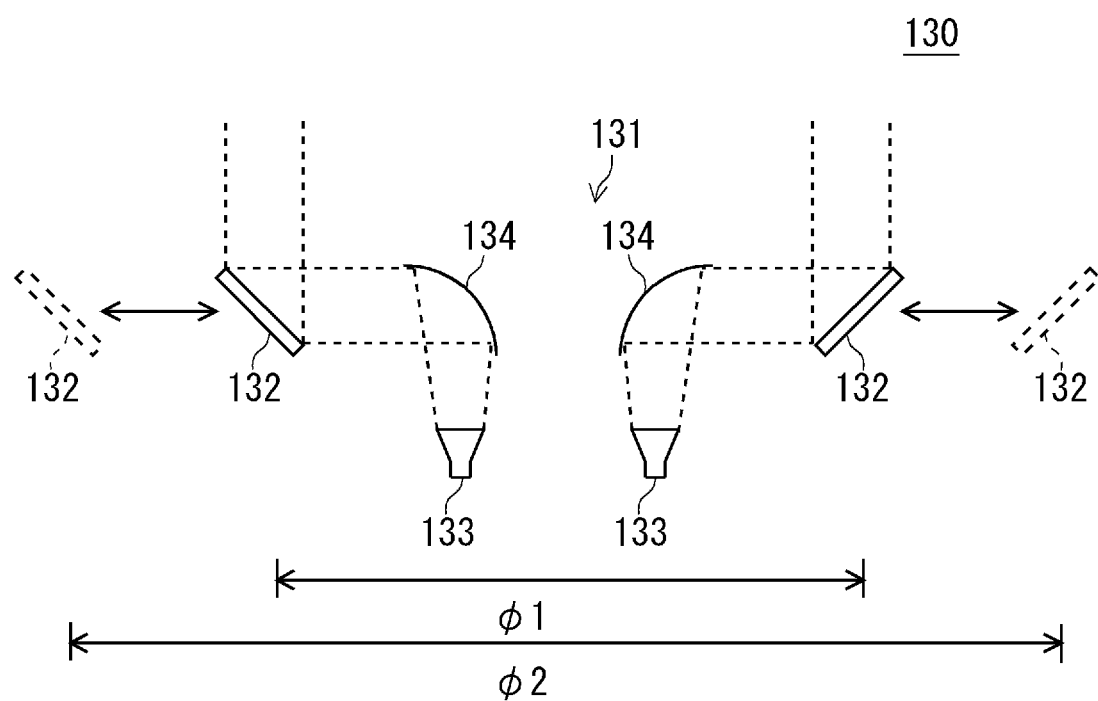
FIG. 8 is a side view of a part of the antenna apparatus when viewed in a direction parallel to the circular plane.

FIGS. 6, 7, and 8 each show a configuration example of the antenna apparatus. FIG. 6 is a perspective view of an antenna apparatus 130 as viewed obliquely. FIG. 7 is a front view of the antenna apparatus 130 when viewed from the front. FIG. 8 is a side view of a part of the antenna apparatus 130 when viewed in a direction parallel to the circular plane. The antenna apparatus 130 can be used as the antenna part (transmission antenna unit) 111 on the transmission side and the antenna part (reception antenna unit) 120 on the reception side. Note that, in the following description, a case in which the antenna apparatus 130 is used as the antenna part 111 on the transmission side will be mainly described. The description of the case in which the antenna apparatus 130 is used as the antenna part 120 on the reception side is similar to the description of the case in which the antenna apparatus 130 is used as the antenna part 111 on the transmission side except that the direction of the radio signal is opposite.

The antenna apparatus 130 includes a signal radiation unit 131 and a plurality of reflection plates 132. The antenna apparatus 130 is configured as a circular array antenna in which radiation points of radio signals are arranged in a circular shape. As shown in FIG. 6, in this example embodiment, the antenna apparatus 130 may configured so as to be integrated with the RF unit 202. Further, the antenna apparatus 130 may be configured so as to be integrated with the RF unit 301 (see FIG. 5) on the reception side. The antenna apparatus 130 corresponds to the antenna apparatus 10 shown in FIG. 1. The signal radiation unit 131 corresponds to the radiator 11 shown in FIG. 1, and the reflection plate 132 corresponds to the reflector 12 shown in FIG. 1.

The signal radiation unit 131 is disposed near the center of a circle. The signal radiation unit 131 outputs a radio signal along a radial direction of the circle from the vicinity of the center of the circle. As shown in FIG. 8, the signal radiation unit 131 includes a plurality of radiators 133 and a plurality of parabolic reflectors 134. The plurality of radiators 133 and the plurality of parabolic reflectors 134 are arranged, for example, at equal intervals on the circumference concentric with the center of the circular array antenna.

The radiators 133 are respectively connected to the up-converters 221 (see FIG. 4) of the RF unit 202 using a waveguide or the like. Alternatively, the radiators 133 may be respectively connected to the down-converters 311 (see FIG. 5) of the RF unit 301 using a waveguide or the like. Each radiator 133 is configured as, for example, a horn antenna. Each radiator 133 outputs a radio signal, for example, in a direction perpendicular to the circular plane.

The parabolic reflectors 134 respectively reflect radio signals output from the radiators 133, for example, in a direction parallel to the circular plane. The parabolic reflector 134 reflects a radio signal and makes the reflected radio signal incident on the reflection plate 132 as a plane wave. The reflection plate 132 reflects the incident radio signal toward the opposite antenna apparatus on the reception side. For example, the reflection plate 132 reflects a radio signal as a plane wave in a direction perpendicular to the circular plane. The reflection plate 132, the radiator 133, and the parabolic reflector 134 correspond to the antenna elements 112 shown in FIG. 4.

In this example embodiment, the reflection plate 132 is configured so that the position thereof is adjustable along the radial direction of the circle. By changing the position of the reflection plate 132, the position where a radio signal is output can be changed in the antenna apparatus 130. After the adjustment, the reflection plate 132 is positioned using a fixture such as a screw.

The position of each reflection plate 132 is adjusted so that a desired antenna diameter can be obtained. For example, as shown in FIG. 8, the position of each reflection plate 132 is adjusted to a position which is away from the center of the circle by $\Phi 1/2$. In this case, the radio signal output from the antenna apparatus 130 is equivalent to that output from a circular array antenna having an antenna diameter of $\Phi 1$. The position of each reflection plate 132 can be adjusted to a position which is away from the center of the circle by $\Phi 2/2$. In this case, the radio signal output from the antenna apparatus 130 is equivalent to that output from a circular array antenna having an antenna diameter of $\Phi 2$.

A relation between an antenna diameter and a transmission distance (a link distance) will be described below. A reception characteristic of each radio signal of an OAM mode changes in accordance with the antenna diameter in a circular array antenna and the transmission distance. Here, the transmission distance means, for example, a distance between two antennas facing each other. When the antenna diameter is constant, a satisfactory reception characteristic may be obtained at one transmission distance, but a satisfactory reception characteristic may not be obtained at another transmission distance.

Figure 9:
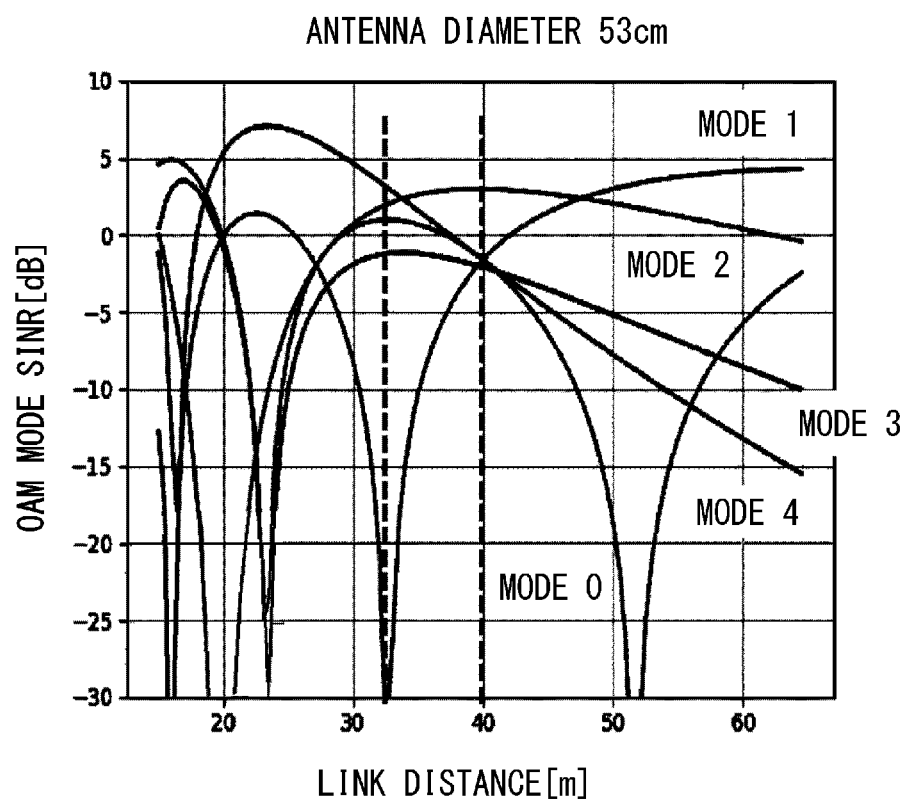
FIG. 9 is a graph showing a relation between a reception characteristic of an OAM mode radio signal and a link distance when an antenna diameter is 53 cm.

FIG. 9 shows a relation between a reception characteristic of an OAM mode radio signal and a link distance when an antenna diameter is 53 cm. Here, Signal to Interference plus Noise power Ratio (SINR) is used as the reception characteristic. In the graph shown in FIG. 9, the vertical axis indicates the SINR (dB), and the horizontal axis indicates the link distance (m). The results shown in FIG. 9 were obtained by calculating the SINR at each link distance when the antenna diameter was 53 cm using a simulation.

When, for example, five OAM modes from a mode 0 to a mode 4 are multiplexed in OAM mode multiplex transmission, it can be seen by referring to FIG. 9 that the difference between the SINRs of the respective OAM modes is small when the link distance is 40 m. Therefore, in this case, by using an antenna having an antenna diameter of 53 cm and performing radio communication at the link distance of 40 m, it is possible to perform radio communication with satisfactory reception characteristics. On the other hand, when the link distance is 32 m, the SINR in the mode 1 is degraded. In order to perform OAM mode multiplex transmission with satisfactory reception characteristics for all five OAM modes, it is necessary to use antennas having different antenna diameters.

Figure 10:
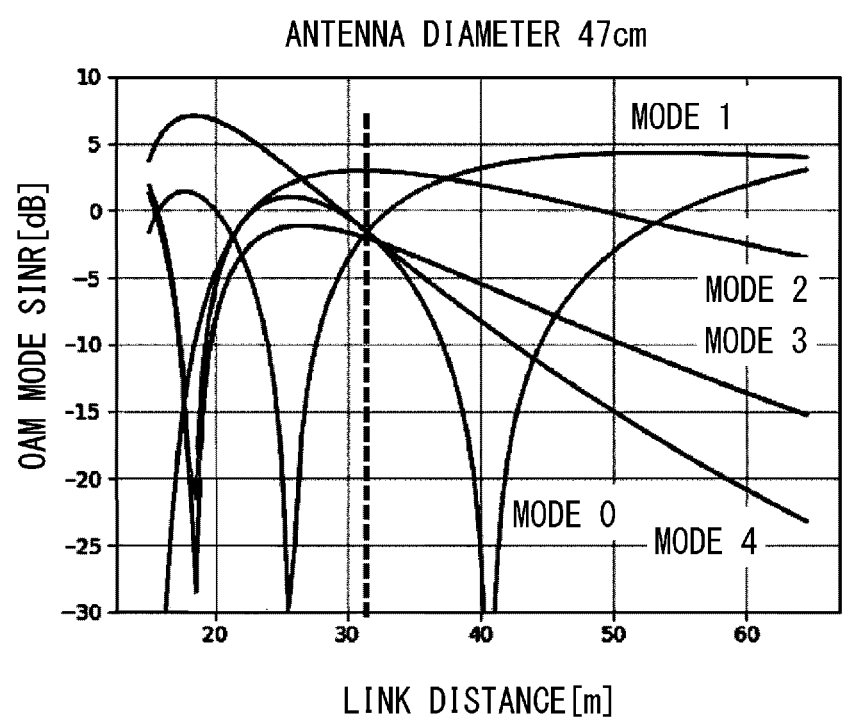
FIG. 10 is a graph showing a relation between a reception characteristic of an OAM mode radio signal and a link distance when an antenna diameter is 47 cm.

FIG. 10 shows a relation between a reception characteristic of an OAM mode radio signal and a link distance when an antenna diameter is 47 cm. In the graph shown in FIG. 10, the vertical axis indicates SINR (dB), and the horizontal axis indicates the link distance (m). The results shown in FIG. 10 were obtained by calculating the SINR at each link distance when the antenna diameter was 47 cm using a simulation. When an antenna having an antenna diameter of 47 cm is used, it can be seen by referring to FIG. 10 that the difference between the SINRs of the respective OAM modes is small when the link distance is 32 m. Therefore, when the link distance is 32 m, the use of an antenna having an antenna diameter of 47 cm enables radio communication with satisfactory reception characteristics.

As described above, when the transmission distance is 40 m, the antenna diameter enabling radio communication with satisfactory reception characteristics is 53 cm, while when the transmission distance is 32 m, the antenna diameter enabling radio communication with satisfactory reception characteristics is 47 cm. When the transmission distance is 40 m, an operator moves the position of each reflection plate 132 in the antenna parts 111 and 120 to a position which is 26.5 cm away from the center of the circle. In this case, the antenna parts 111 and 120 can be used as antennas respectively having an antenna diameter of 53 cm. On the other hand, when the transmission distance is 32 m, an operator moves the position of each reflection plate 132 in the antenna parts 111 and 120 to a position which is 23.5 cm away from the center of the circle. In this case, the antenna parts 111 and 120 can be used as antennas respectively having an antenna diameter of 47 cm.

In this example embodiment, in the antenna parts 111 and 120, the position of the reflection plate 132 in the radial direction of the circle is adjustable. By changing the position of the reflection plate 132, the radiation position of a radio signal on the circular plane can be changed and the antenna diameter can be changed. Note that even when the radiator itself that outputs a radio signal is configured to be movable along the radial direction of the circle, the antenna diameter can be changed. However, each radiator may be connected to an associated RF unit or the like using a waveguide. Therefore, it is difficult to move each radiator in the radial direction. Further, in Patent Literature 1, a desired antenna diameter can be achieved by replacing the parabolic mirror part. However, in Patent Literature 1, it is necessary to replace components in order to change the antenna diameter. In this example embodiment, an antenna diameter can be adjusted while the position of the radiator 133 is fixed and without replacing components.

Figure 11:
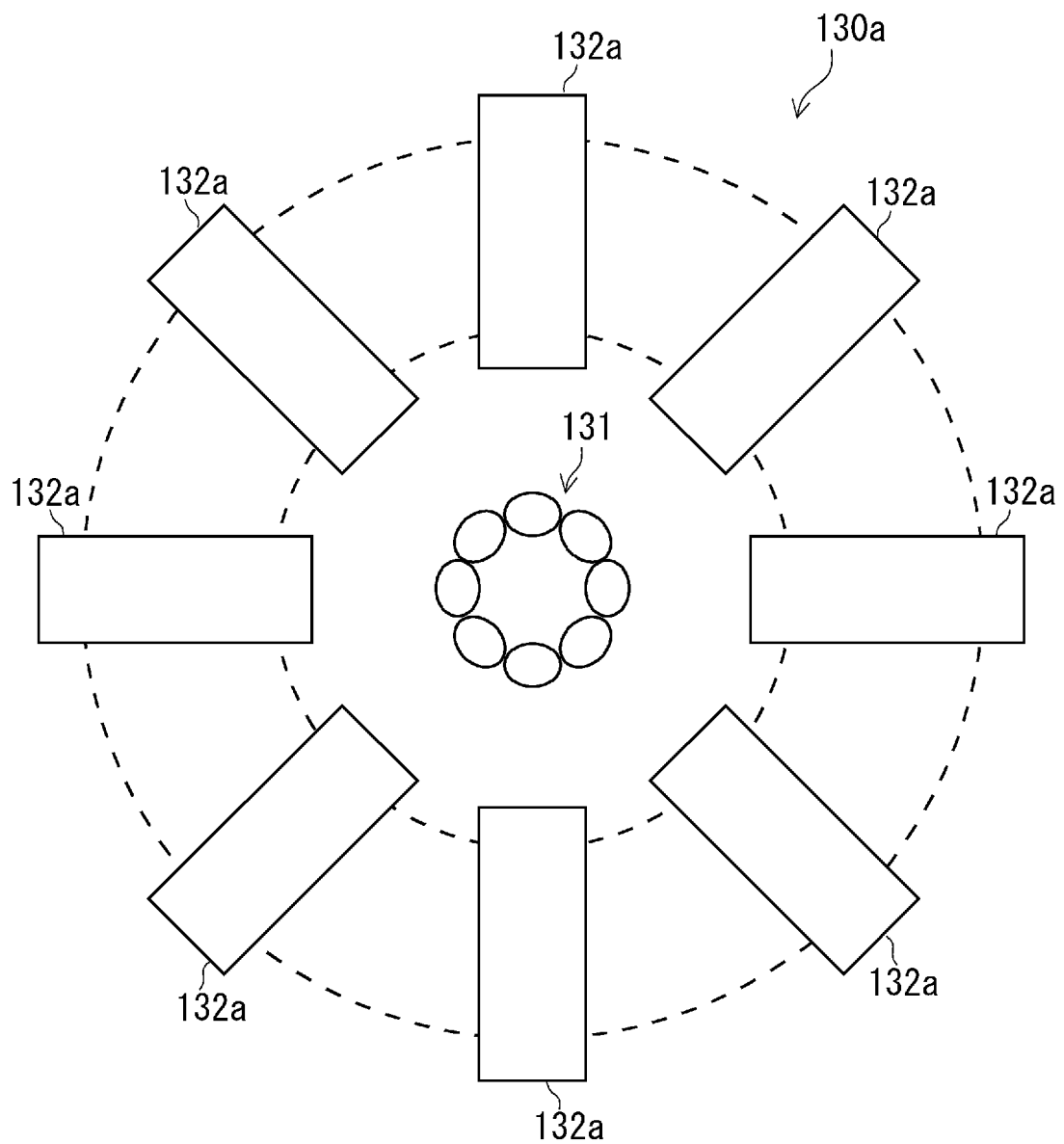
FIG. 11 is a front view of the antenna apparatus according to a second example embodiment of the present disclosure when viewed from the front.
Figure 12:
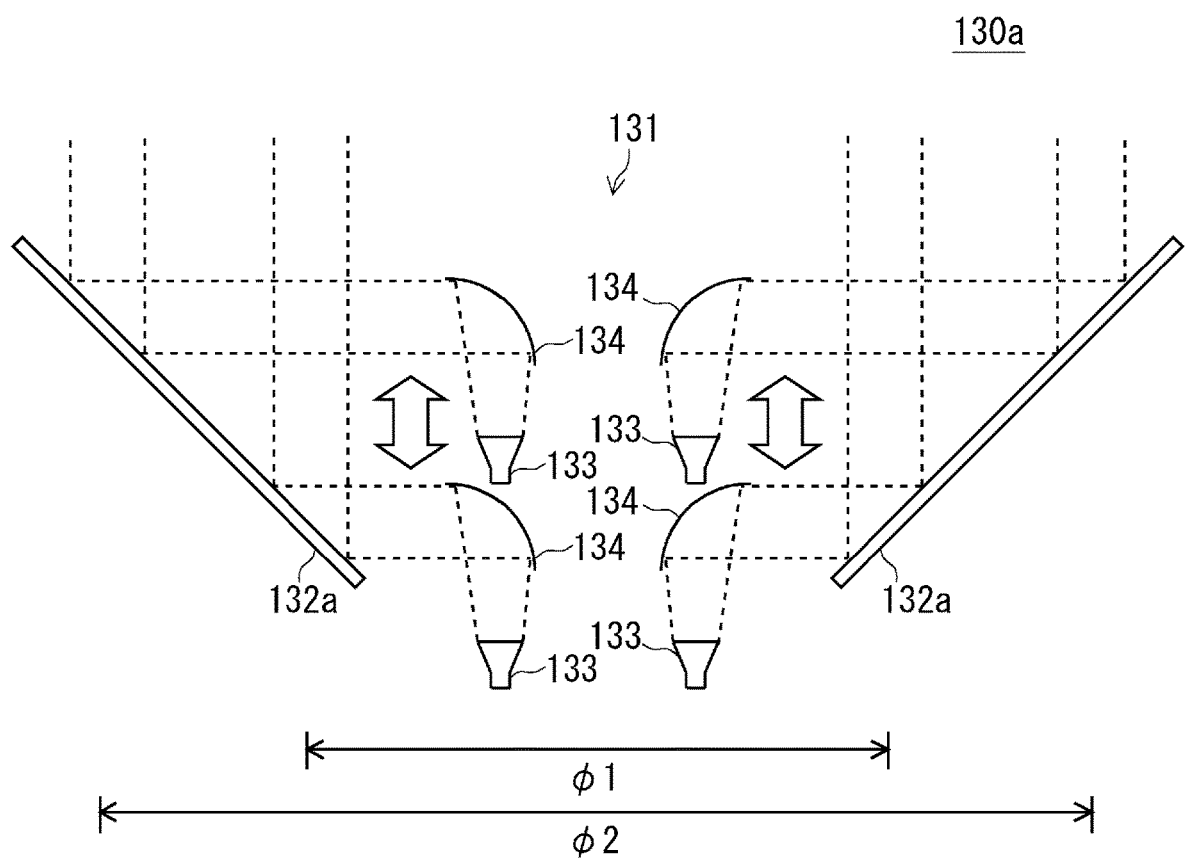
FIG. 12 is a side view of a part of the antenna apparatus when viewed in a direction parallel to the circular plane.

Next, a second example embodiment of the present disclosure will be described. FIGS. 11 and 12 each show an antenna apparatus according to the second example embodiment of the present disclosure. FIG. 11 is a front view of an antenna apparatus 130a when viewed from the front. FIG. 12 is a side view of a part of the antenna apparatus 130a when viewed in a direction parallel to the circular plane. In the antenna apparatus 130a according to this example embodiment, a reflection plate 132a having a reflection surface inclined at a predetermined angle with respect to the circular plane is used. The antenna apparatus 130a is configured so that a distance between the signal radiation unit 131 and a part of the reflection plate 132a at which a radio signal is reflected is adjustable by changing the relative position between the reflection plate 132a and the signal radiation unit 131 in a direction perpendicular to the circular plane. The configurations other than the above one may be similar to those of the first example embodiment.

In this example embodiment, for example, the radiator 133 and the parabolic reflector 134 constituting the signal radiation unit 131 are configured to be displaceable in the direction perpendicular to the circular plane. In each reflection plate 132a, the position at which a radio signal is reflected changes in accordance with the position of each of the radiator 133 and the parabolic reflector 134 in the direction perpendicular to the circular plane. For example, when the position of the radiator 133 and the position of the parabolic reflector 134 are each adjusted to a position at which a radio signal is reflected at a position away from the center of the circle by $\Phi1/2$, the antenna diameter of the antenna apparatus 130a can be set to $\Phi1$. Further, when the radiator 133 and the parabolic reflector 134 are adjusted to a position at which a radio signal is reflected at a position away from the center of the circle by $\Phi2/2$, the antenna diameter of the antenna apparatus 130a can be set to $\Phi2$.

In this example embodiment, the antenna apparatus 130a is configured so that the relative position between the signal radiation unit 131 and the reflection plate 132a in the direction perpendicular to the circular plane can be changed. By moving at least one of the signal radiation unit 131 and the reflection plate 132a and changing the relative position between these unit and plate, the distance between the center of the circle and the part of the reflection plate 132a at which a radio signal is reflected can be changed. Therefore, in this example embodiment, like in the first example embodiment, an antenna diameter can be adjusted without replacing components.

Note that, although an example has been described in which the reflection plate reflects a radio signal in a direction perpendicular to the circular plane in the antenna apparatus in each of the above example embodiments, the present disclosure is not limited thereto. The reflection plate does not necessarily need to reflect a radio signal strictly in the direction perpendicular to the circular plane if it can receive a signal transmitted by the opposite radio receiver. For example, in FIG. 8, the reflection plate 132 may reflect a radio signal at an angle slightly inclined from the direction perpendicular to the circular plane.

Further, although an example has been described in which the radiator 133 radiates a radio signal in the direction perpendicular to the circular plane and the parabolic reflector 134 reflects the radio signal in the direction parallel to the circular plane in each of the above example embodiments, the present disclosure is not limited thereto. In each example embodiment, the antenna apparatus may emit a radio signal from the reflection plate at an angle close to perpendicular to the circular plane, and the direction in which the radiator 133 emits a radio signal and the direction in which the parabolic reflector 134 reflects the radio signal are not limited to any particular combination described above.

The example embodiment according to the present disclosure has been described above in detail. However, the present disclosure is not limited to the example embodiment described above, and the example embodiment to which changes and corrections have been made without departing from the spirit of the disclosure is included in the present disclosure.

For example, the whole or part of the example embodiments disclosed above can be described as, but not limited to, the following supplementary notes.

(Supplementary Note 1)

An antenna apparatus comprising a plurality of antenna elements each configured to emit a radio signal transmitted to an opposite antenna apparatus, wherein each of the plurality of antenna elements comprises a radiator configured to output the radio signal from a center of a circle along a radial direction thereof, and a reflector configured to reflect the radio signal output from the radiator toward the opposite antenna apparatus, and a distance between the center of the circle and a part of the reflector at which the radio signal is reflected is adjustable along the radial direction of the circle.

(Supplementary Note 2)

The antenna apparatus according to Supplementary note 1, wherein the reflector is disposed so as to be able to be displaced along the radial direction of the circle.

(Supplementary Note 3)

The antenna apparatus according to Supplementary note 1, wherein the reflector has a reflection surface inclined at a predetermined angle with respect to a circular plane, and the distance between the center of the circle and the part of the reflector at which the radio signal is reflected is adjustable by changing a relative position between the reflector and the radiator.

(Supplementary Note 4)

The antenna apparatus according to any one of Supplementary notes 1 to 3, wherein the antenna element further comprises a parabolic reflector configured to reflect the radio signal output from the radiator and make the reflected radio signal incident on the reflector.

(Supplementary Note 5)

The antenna apparatus according to any one of Supplementary notes 1 to 4, wherein the radiator comprises a horn antenna.

(Supplementary Note 6)

The antenna apparatus according to any one of Supplementary notes 1 to 5, further comprising a Radio Frequency (RF) unit configured to convert an intermediate frequency signal into a radio frequency signal and supply the radio signal to each of the plurality of antenna elements.

(Supplementary Note 7)

The antenna apparatus according to any one of Supplementary notes 1 to 6, wherein the radio signal is an Orbital Angular Momentum (OAM) mode radio signal.

(Supplementary Note 8)

The antenna apparatus according to any one of Supplementary notes 1 to 7, wherein the radiators are arranged at equal intervals on a circumference concentric with the center of the circle.

(Supplementary Note 9)

The antenna apparatus according to any one of Supplementary notes 1 to 8, wherein the radiator is configured to receive a radio signal transmitted from the opposite antenna apparatus via the reflector.

(Supplementary Note 10)

An antenna apparatus comprising a plurality of antenna elements each configured to receive a radio signal transmitted from an opposite antenna apparatus, wherein each of the plurality of antenna elements comprises a reflector configured to reflect the radio signal toward a center of a circle along a radial direction thereof, and a radiator to which the radio signal is input via the reflector, and a distance between the center of the circle and a part of the reflector at which the radio signal is reflected is adjustable along the radial direction of the circle.

(Supplementary Note 11)

A radio transmitter comprising:

a radio signal generation unit configured to generate a radio signal transmitted toward an opposite radio receiver; and an antenna unit configured to transmit the radio signal, wherein the antenna unit comprises a plurality of antenna elements each configured to emit the radio signal, each of the plurality of antenna elements comprises a radiator configured to output the radio signal from a center of a circle along a radial direction thereof, and a reflector configured to reflect the radio signal output from the radiator toward the opposite radio receiver, and a distance between the center of the circle and a part of the reflector at which the radio signal is reflected is adjustable along the radial direction of the circle.

(Supplementary Note 12)

The radio transmitter according to Supplementary note 11, wherein the radio signal generation unit comprises an OAM mode signal multiplexing unit configured to multiplex a plurality of signals to a plurality of Orbital Angular Momentum (OAM) modes.

(Supplementary Note 13)

A radio receiver comprising:

an antenna unit configured to receive a radio signal from an opposite radio transmitter; and a radio signal processing unit configured to demodulate a transmission signal from the radio signal, wherein the antenna unit comprises a plurality of antenna elements each configured to receive the radio signal, each of the plurality of antenna elements comprises a reflector configured to reflect the radio signal toward a center of a circle along a radial direction thereof, and a radiator to which the radio signal is input via the reflector, and a distance between the center of the circle and a part of the reflector at which the radio signal is reflected is adjustable along the radial direction of the circle.

(Supplementary Note 14)

The radio receiver according to Supplementary note 13, wherein the radio signal processing unit comprises an OAM mode signal separation unit configured to separate a plurality of signals multiplexed to a plurality of Orbital Angular Momentum (OAM) modes.

(Supplementary Note 15)

A radio communication system comprising:

a radio transmitter comprising a radio signal generation unit configured to generate a radio signal, and a transmission antenna unit configured to transmit the radio signal; and a radio receiver comprising a reception antenna unit configured to receive a radio signal transmitted from the transmission antenna unit, and a radio signal processing unit configured to demodulate the radio signal, wherein the transmission antenna unit comprises a plurality of transmission antenna elements each configured to emit the radio signal, each of the plurality of transmission antenna elements comprises a radiator configured to output the radio signal from a center of a circle along a radial direction thereof and a reflector configured to reflect the radio signal output from the radiator toward the reception antenna unit, and a distance between the center of the circle and a part of the reflector at which the radio signal is reflected is adjustable along the radial direction of the circle, and the reception antenna unit comprises a plurality of reception antenna elements each configured to receive a radio signal, each of the plurality of reception antenna elements comprises a reflector configured to reflect the radio signal toward a center of a circle along a radial direction thereof and a radiator to which the radio signal is input via the reflector, and a distance between the center of the circle and a part of the reflector at which the radio signal is reflected is adjustable along the radial direction of the circle.

(Supplementary Note 16)

The radio communication system according to Supplementary note 15, wherein the radio signal generation unit comprises an OAM mode signal multiplexing unit configured to multiplex a plurality of signals to a plurality of Orbital Angular Momentum (OAM) modes, and the radio signal processing unit comprises an OAM mode signal separation unit configured to separate the plurality of signals multiplexed to the plurality of OAM modes.

(Supplementary Note 17)

An antenna diameter adjustment method for adjusting an antenna diameter by changing a distance between a part of each of a plurality of reflectors at which the radio signal is reflected, the plurality of reflectors each being configured to reflect radio signals emitted from a plurality of radiators from a center of a circle along a radial direction thereof and to radiate the radio signal toward an opposite antenna apparatus, and the center of the circle along the radial direction of the circle.

This application is based upon and claims the benefit of priority from Japanese patent application No. 2019-112170, filed on Jun. 17, 2019, the disclosure of which is incorporated herein in its entirety by reference.

REFERENCE SIGNS LIST

10 ANTENNA APPARATUS
11 RADIATOR
12 REFLECTOR
100 RADIO COMMUNICATION SYSTEM
101 RADIO TRANSMITTER
102 RADIO RECEIVER
110 RADIO SIGNAL GENERATION UNIT
111, 120 ANTENNA PART
112, 122 ANTENNA ELEMENT
121 RADIO SIGNAL PROCESSING UNIT
130 ANTENNA APPARATUS
131 SIGNAL RADIATION UNIT
132 REFLECTION PLATE
133 RADIATOR
134 PARABOLIC REFLECTOR
201 IF UNIT
202 RF UNIT
211 MODULATION UNIT

212 OAM MODE SIGNAL MULTIPLEXING UNIT
214 IF SIGNAL PROCESSING UNIT
221 UP-CONVERTER
301 RF UNIT
302 IF UNIT
311 DOWN-CONVERTER
321 IF SIGNAL PROCESSING UNIT
333 OAM MODE SIGNAL SEPARATION UNIT
334 DEMODULATION UNIT

What is claimed is:

1. An antenna apparatus comprising:
a plurality of radiators arranged on a circumference of a first circle having a first radius;
a plurality of reflectors arranged on a circumference of a second circle which is concentric with the first circle, the second circle having a second radius larger than the first circle; and
a plurality of parabolic reflectors, wherein
the plurality of radiators are each configured to output a radio signal toward each of the plurality of reflectors along a radial direction of the second circle,
the plurality of reflectors each have a reflection surface inclined at a predetermined angle with respect to a circular plane and are each configured to reflect the radio signal output from a respective radiator toward an opposite antenna apparatus, and
the plurality of parabolic reflectors are each configured to reflect the radio signal output from a respective radiator such that the reflected radio signal is incident on a respective reflector.

2. The antenna apparatus according to claim 1, wherein each of the plurality of radiators comprises a horn antenna.

3. The antenna apparatus according to claim 1, further comprising a Radio Frequency (RF) converter configured to convert an intermediate frequency signal into a radio frequency signal and supply the radio signal to each of the plurality of radiators.

4. The antenna apparatus according to claim 1, wherein the radio signal is an Orbital Angular Momentum (OAM) mode radio signal.

5. The antenna apparatus according to claim 1, wherein the plurality of radiators are arranged at equal intervals on the circumference of the first circle, and the plurality of the reflectors are arranged at equal intervals on the circumference of the second circle.

6. The antenna apparatus according to claim 1, wherein each of the plurality of radiators is configured to receive the radio signal as transmitted from the opposite antenna apparatus via the respective reflector.

7. A radio transmitter comprising:
a generator configured to generate the radio signal that is then transmitted toward an opposite radio receiver; and
the antenna apparatus according to claim 1.

8. The radio transmitter according to claim 7, wherein the generator comprises an OAM mode signal multiplexer configured to multiplex a plurality of signals to a plurality of Orbital Angular Momentum (OAM) modes.

9. An antenna diameter adjustment method, comprising adjusting an antenna diameter of the antenna apparatus according to claim 1 by changing a distance between a part of each of the plurality of reflectors at which the radio signal is reflected and the center of the first and second circles along the radial direction.

* * * * *